United States Patent [19]
Ueno et al.

[11] Patent Number: 5,398,555
[45] Date of Patent: Mar. 21, 1995

[54] TORQUE DETECTION APPARATUS OF POWER TRAIN

[75] Inventors: Sadayasu Ueno; Yutaka Nishimura; Yasunori Mouri, all of Katusta; Nobuo Kurihara, Hitachiota; Hiroshi Kuroiwa, Hitachi; Mitsuhiro Masuda, Katsuta; Shigeru Horikoshi, Mito; Matsuo Amano, Hitachi; Kazuto Kinoshita, Tsukuba; Junichi Ishii, Katsuta; Kiyoshi Horibe, Hitachi; Kiyoshi Miura, Ibaraki, all of Japan

[73] Assignee: Hitachi, Ltd., Tokyo, Japan

[21] Appl. No.: 281,143

[22] Filed: Jul. 27, 1994

Related U.S. Application Data

[63] Continuation of Ser. No. 859,987, Mar. 30, 1992, abandoned.

[30] Foreign Application Priority Data

Mar. 29, 1991 [JP] Japan ................................. 3-066003

[51] Int. Cl.⁶ .............................................. G01L 3/00
[52] U.S. Cl. ........................ 73/862.326; 73/862.321
[58] Field of Search .................. 73/862.31, 862.326, 73/862.328, 862.193, 862.329; 74/337; 475/125, 266, 257, 200, 206

[56] References Cited

U.S. PATENT DOCUMENTS

| | | | |
|---|---|---|---|
| 2,978,902 | 4/1961 | Felder | 73/862.326 |
| 3,049,003 | 8/1962 | Felder | 73/862.326 |
| 3,545,265 | 12/1970 | McIlraith et al. | 73/862.28 |
| 4,513,628 | 4/1985 | Kohama et al. | 73/862.328 |
| 4,817,470 | 4/1989 | Müller et al. | 74/866 |
| 4,874,053 | 10/1989 | Kimura et al. | 180/79.1 |
| 4,938,098 | 7/1990 | Sasaki et al. | 475/206 |

Primary Examiner—Richard E. Chilcot, Jr.
Assistant Examiner—R. Biegel
Attorney, Agent, or Firm—Antonelli, Terry, Stout & Kraus

[57] ABSTRACT

A torque detection mechanism can be provided for a power train and its control unit without newly adding a sensor and its signal processing module. As a gear pair for the torque detection mechanism of a phase difference type, existing gears in a transmission are used, or a gear pair for this mechanism are provided adjacent to these existing gears. From phase signals sent from pickups, a phase difference signal is obtained by use of one part of existing devices in the control unit. The torque detection mechanism can be realized with the minimum number of component parts by utilizing the existing members and spaces instead of newly adding a sensor and its module. The invention can be applied to either of FF and FR cars, and has a practical structure in respect of the performance, costs and reliability.

16 Claims, 4 Drawing Sheets

TORQUE DETECTION APPARATUS OF POWER TRAIN

This application is a continuation of Ser. No. 07/859,987, filed Mar. 30, 1992, now abandoned.

BACKGROUND OF THE INVENTION

The present invention relates to a torque detection technique and, more particularly, to a torque detection technique of a phase difference type which is suitable for torque detection of a power train for an automobile.

As a torque detection technique of this type, there has conventionally been suggested an arrangement in which a sensor itself independently comprises a torque detection mechanism which is integrally packaged in it so as to be used when attached to a power transmission shaft. In this case, a method of detecting torsion of a power transmission shaft such as a magnetostriction type and a phase difference type is employed in many cases as a torque detection method. Examples of such technique are disclosed in Japanese Patent Unexamined Publication Nos. 60-220834, 58-167933, 60-93327 and so forth.

SUMMARY OF THE INVENTION

However, this kind of structure involves the following technical problems which make it difficult to put it into practical use. That is to say, in the case of the magnetostriction type, a magnetic property of a detection member causes temperature errors and elapsed time changes in an atmosphere of a lubricant at high temperature. The magnetostriction type and the phase difference type have a common problem that there is almost no extra space around an output shaft in a transmission in which an independent mechanism for torque detection is installed. The costs are inevitably raised because a signal processing circuit required for temperature correction, elapsed time change correction and the like is provided, as an independent module, on the sensor.

The present invention has been achieved to solve these problems, and it is therefore a primary object to provide a torque detection mechanism on an output shaft in a transmission.

A secondary object of the invention is to provide a signal processing mechanism without adding a signal processing circuit as an independent module to a sensor.

The primary object can be attained by employing a torque detection mechanism of a so-called phase difference type by which torsion of an output transmission shaft is detected from a phase difference between a pair of gears, and by using an existing gear attached to the output transmission shaft in a transmission as at least one of the gear pair of this torque detection mechanism of the phase difference type.

Next, the secondary object can be attained by a method of converting phase signals obtained from a pair of pickups for detecting phases of the gear pair into a phase difference signal in an existing control unit comprising a processor mechanism and a digital signal processing mechanism, and outputting it as a clock pulse signal linking to a phase difference or as a D-A signal.

With the structure in relation to the primary object, the torque detection mechanism can be provided in the transmission by use of a small space and a small number of component parts, and also, the cost increase can be suppressed by utilizing the existing members.

With the structure in relation to the secondary object, an additional mechanism for processing a phase difference signal is not required, and besides, the cost increase can be suppressed by utilizing the existing processor mechanism and the existing signal processing mechanism.

According to the present invention, the torque detection mechanism can be provided for the power train without newly adding a sensor and its signal processing module independently but utilizing the existing members and spaces so as to realize the mechanism with a minimum number of additional means. Therefore, the invention can be applied to either of FF (front engine, front wheel drive) and FR (front engine, rear wheel drive) cars, and has a practical structure in respect of the performance, costs and reliability as a result of application of the technique which has made remarkable achievements.

DESCRIPTION OF THE PREFERRED EMBODIMENTS

A first embodiment of the present invention will now be described with reference to the attached drawing.

Figure 1:
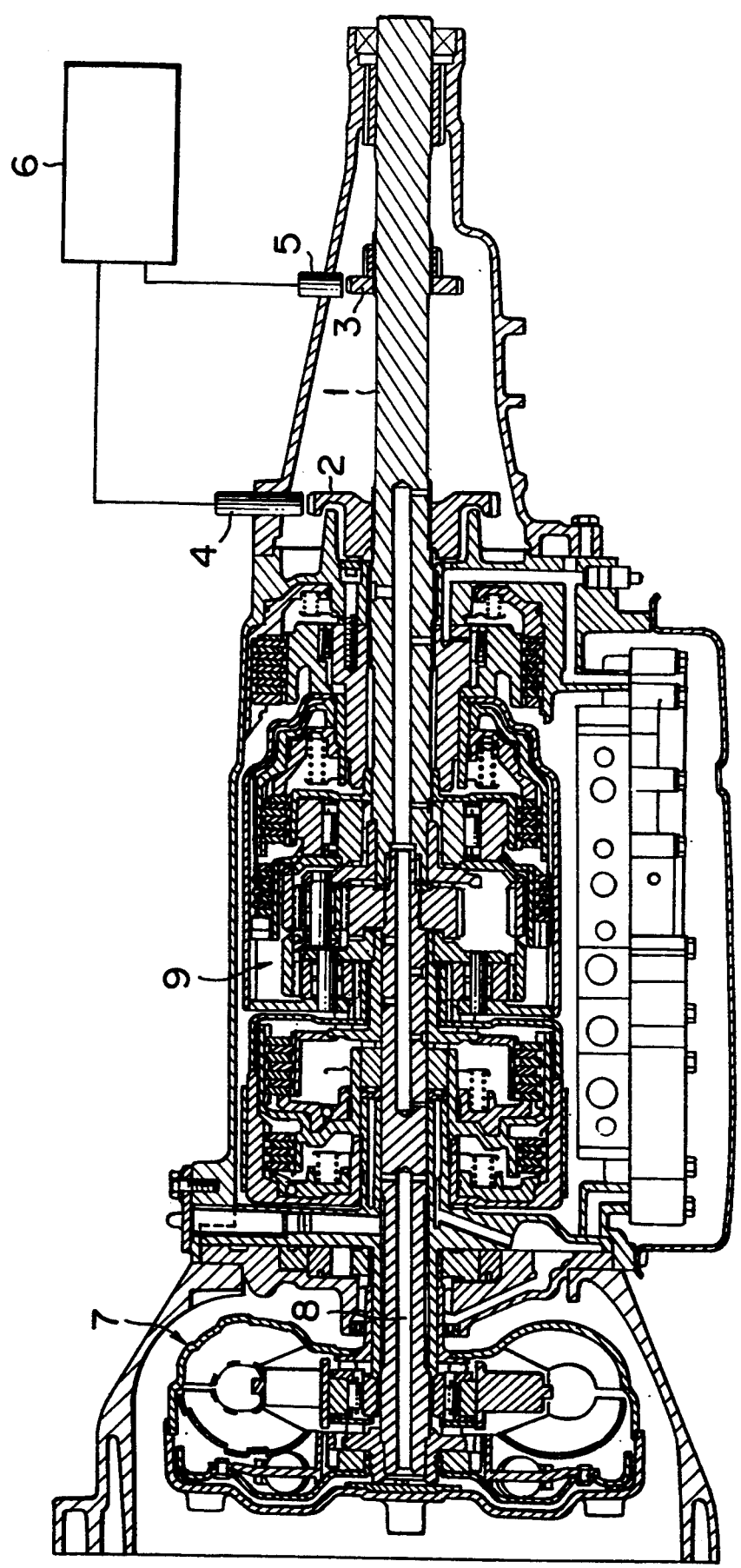
FIG. 1 is a system structure view showing a first embodiment of the present invention.

FIG. 1 illustrates one example in which the invention is applied to a transmission for an FR car. A torque detection mechanism shown in the drawing functions in such a manner that phases of a speed and parking gear 2 and a worm gear 3, which are rigidly fixed with an output shaft 1 interposed therebetween, are detected by pickups 4 and 5, respectively, and subjected to signal processing in a power train control unit 6 so as to obtain a phase difference.

The function of the transmission will be briefly described here referring to FIG. 1. The output from an engine is transmitted, via a torque converter 7, to an input shaft 8, and further transmitted, via a gear train 9, to the output shaft 1.

When a gear pair is rigidly fixed on an output transmitting shaft, it will be located either on the input shaft 8 or on the output shaft 1. In the former case, a turbine rotation gear is already provided, and consequently, an associated gear will be installed either on the torque converter 7 or on the gear train 9. In the case of the output shaft 1, as in the embodiment shown in FIG. 1, there are open spaces at the speed and parking gear 2 and the worm gear 3 so that it will be easy to add the torque detection mechanism by utilizing these spaces. More specifically, that portion of the shaft which is interposed between the gears may be previously formed to have a function as a torsion bar; because the existing gears are different from each other in wheel configuration and size, the same gears may be provided near the existing ones to thereby facilitate the signal processing; and an engagement member for the gear pair may be used for close locations so that the pickups will be united to improve the accuracy, installation efficiency, and cost effectiveness.

Next, a second embodiment of the invention will be described.

Figure 2:
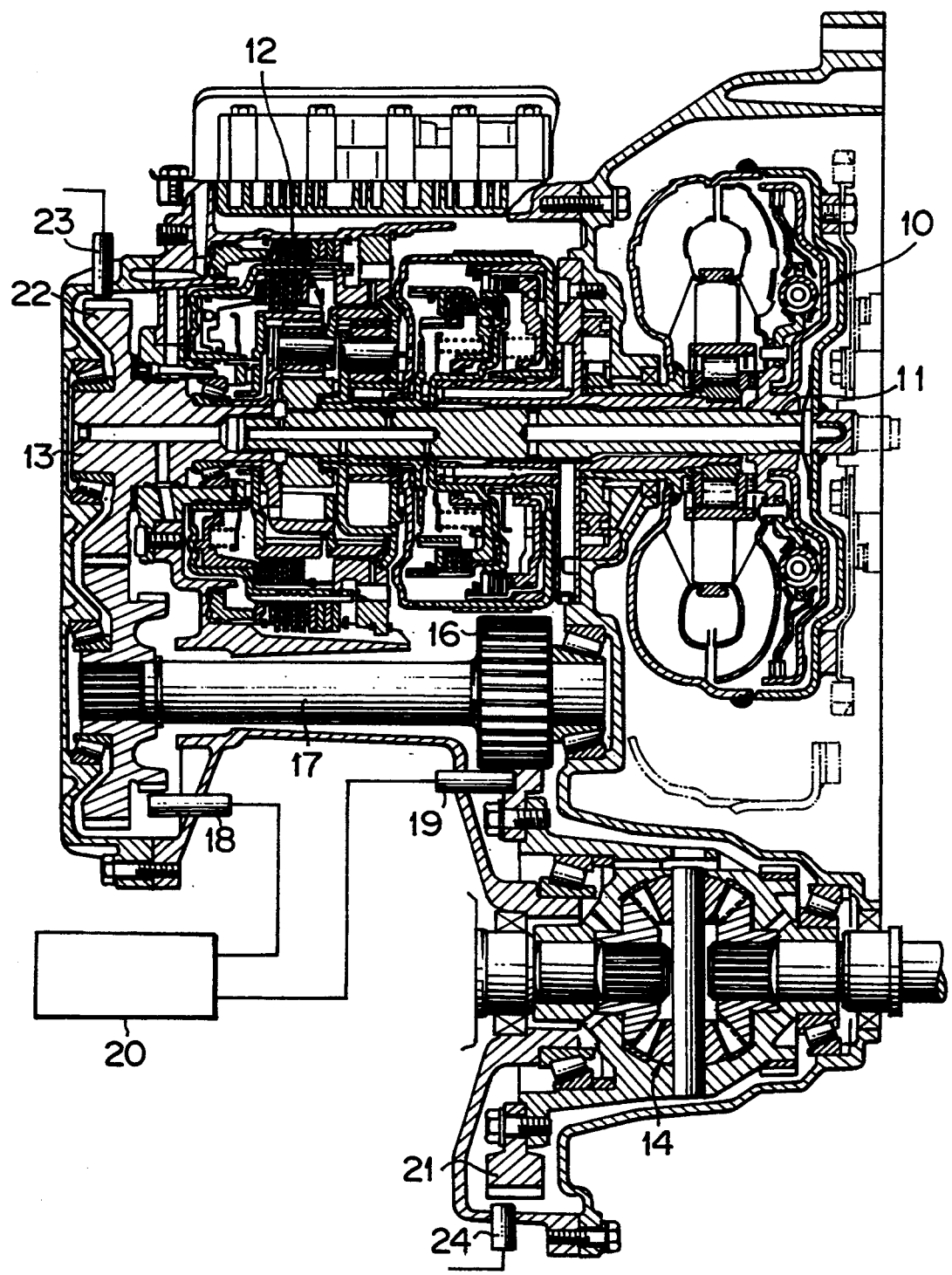
FIG. 2 is a system structure view showing a second embodiment of the invention.

FIG. 2 illustrates the embodiment in which the invention is applied to a transmission for an FF car. In the drawing, a torque converter 10, an input shaft 11, a gear train 12 and an output shaft 13 have the same functions as the corresponding members shown in FIG. 1. An idler gear 15 and a pinion reduction gear 16 constitute a gear pair which detects torsion of a transfer shaft 17 which functions as a torsion bar. From phases detected by pickups 18, 19, a phase difference signal is obtained at a control unit 20. In the case of the FF car, it is difficult to have a space for a torque detection mechanism in the vicinity of the input shaft 11 and the output shaft 13. As a gear pair, a combination of the idler gear 15 and a final gear 21 and a combination of an output gear 22 and the final gear 21 can also be suggested.

Figure 3:
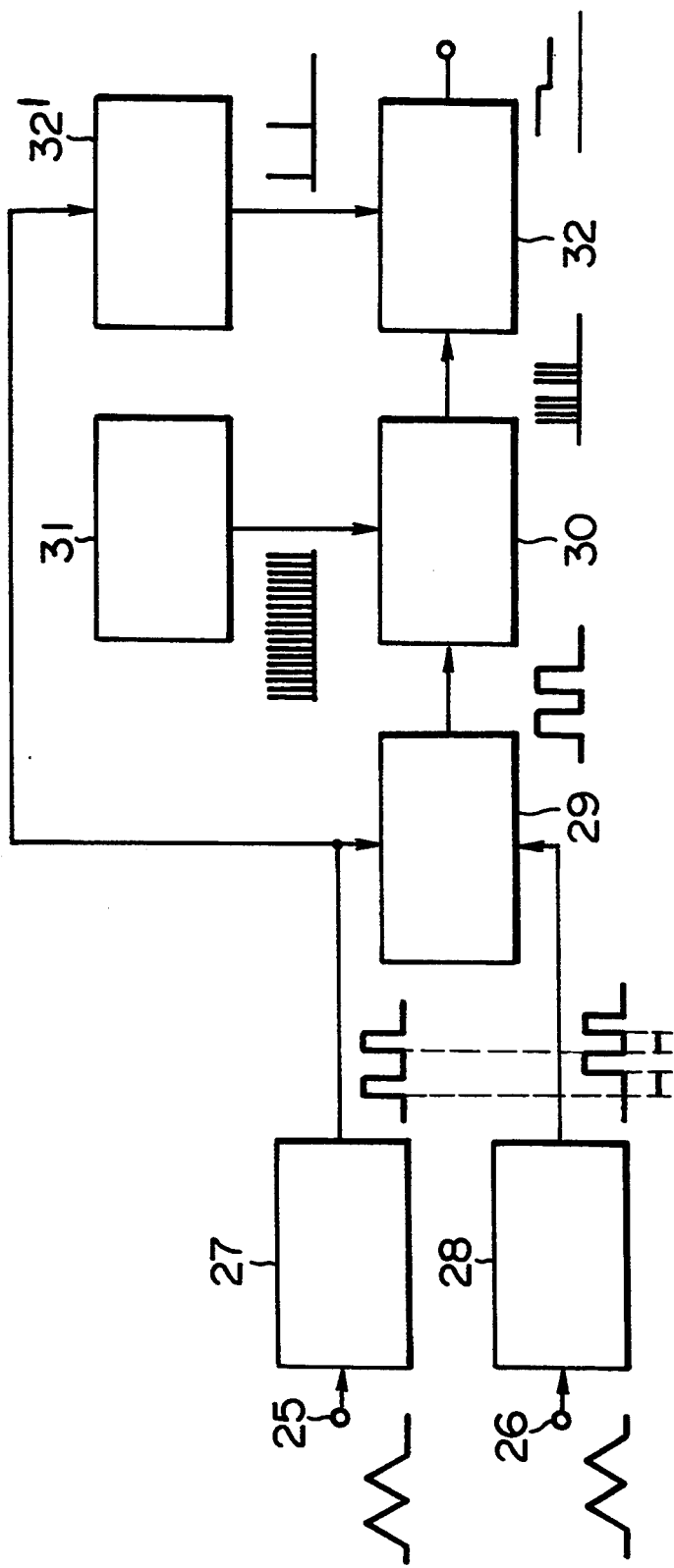
FIG. 3 is a basic structure diagram of a phase difference signal processing circuit showing a third embodiment of the invention.

As a third embodiment of the invention, a basic structure of a circuit for processing a phase difference signal is shown in FIG. 3. In the drawing, reference numerals 25, 26 denote input terminals of phase signals which are detected by a pickup pair. The signals are amplified and their waveforms are shaped in signal processing circuits 27, 28. Then, in a flip-flop circuit 29, they are converted into a so-called phase difference pulse which is turned on only for a period of time corresponding to a phase difference. When a clock pulse from a crystal oscillator 31 and the phase difference pulse are passed through a gate circuit 30, the phase difference pulse of pulse-duration information is converted into a phase difference pulse of pulse-number information. This digital information is subjected to wave detection, rectification and filtration in a circuit 32, and converted into analog information.

The embodiment shown in FIG. 2 requires a space outside of the housing in which the pickup pair corresponding to the gear pair, and wiring for the pickup pair are installed. Actually, a pickup pair 23, 24 having sufficient spaces is in better condition than the pickup pair 18, 19. In this respect, it is not always preferable that the pickup pair is installed on the idler gear 15 and the pinion reduction gear 16 which are rigidly fixed on the transfer shaft 17 which functions as a torsion bar. Rather, the gear pair 21, 22 having spaces in its vicinity can be employed in this embodiment, avoiding the existing gear pair 15, 16.

In the embodiment shown in FIG. 1, the pickup 4 also functions as a speed pickup. It produces a signal of a teeth number per unit time for this function while it produces a phase signal for the function described previously. Since a single pickup outputs a plurality of signals, this embodiment provides not only an effect of reducing the number of component parts but also secondary effects of cost reduction, reliability and so forth.

In the case where the gears in a pair have different outer diameters, the teeth number of the gear having a smaller outer diameter is determined by dividing the teeth number of the gear having a larger outer diameter by an integer, so that pickups in a pair having substantially the same specification can be used. Also, the configurations and dimensions of teeth of the gear pair having different outer diameters as well as the configurations of magnetic paths of the pickups are conformed to each other in order to make magnetic field distributions between the gear pair and the pickup pair similar. As a result, deviation of a phase difference during one rotation of the output shaft, which is a problem of the gear pair having different diameters, can be lessened, thereby putting the different-diameter gear pair into practical use. Another method which is effective to make the different-diameter gear pair practicable is that the dependency of electromagnetic pickups upon the rotational speed is electronically corrected to thereby decrease errors of a phase different signal.

Non-uniformity of parts and materials which constitute the transmission necessitates a method for calibrating the output levels of the gear pair after assembly of the transmission. In a method according to the invention, output characteristics are classified into two levels "High" and "Low". The "Low" level is calibrated after memorizing a phase difference at an automatic gear lever position "Park" or "Neutral" while the car is stopped. The "High" level can be regarded as stable because the relation between the torque and the phase difference depends on the material and dimensions. Therefore, the above-mentioned "Low" level calibration is performed at certain intervals if necessary, thus enabling maintenance of the accuracy over a long period of time.

The phase signals obtained from the pickup pair are converted into the phase difference signal through the existing processors and digital circuits within the control unit and through additional circuits if necessary. The signal processing system can be reduced in size and costs by making the number of additional circuits as small as possible.

A fourth embodiment of the invention will now be described with reference to FIG. 4.

Figure 4:
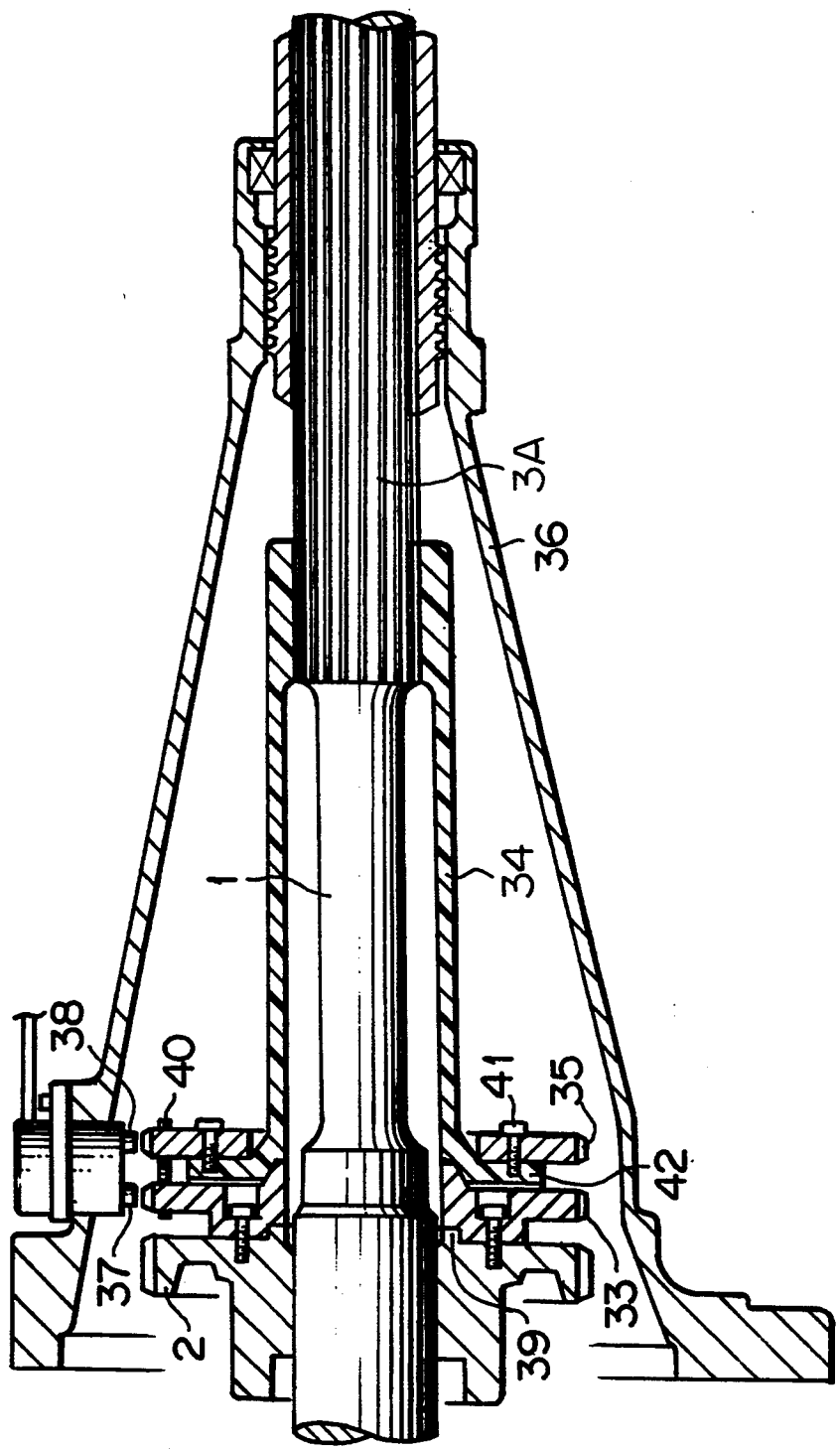
FIG. 4 is a cross-sectional structure view of a detection portion of a phase difference type showing a fourth embodiment of the invention.

FIG. 4 is a cross-sectional view showing an essential portion of a transmission for an FR car. In the drawing, a torsion detecting pipe 34 which is fitted and secured on the worm gear 3A is slidable on the same axis as a first gear 33 for phase detection which is securely fixed adjacent to the parking gear 2, with a torsion-bar portion of the output shaft 1 being interposed therebetween. Reference numeral 39 denotes a guide for axial alignment which is provided on the gear 33. A second gear 35 for phase detection, through which an alignment pin 40 has previously been inserted to align the teeth of the gear 33 with those of the gear 35, is fastened by screw-fasteners 41. It should be noted that the pin 40 is detached after this screw-fastening operation. Pickups 37, 38 corresponding to the gear pair 33, 35 are integrally connected to have a fixed positional relation, and fastened on an extension cover 36. Magnetic paths are generated between the pickup pair 37, 38 and the respective gears. The sensitivity can be improved by forming closed magnetic paths in the gears then. Since the gear pair 33, 35 must be magnetically separated, it is necessary to make a spacer 42, which is integrally formed with the pipe 34, of a non-magnetic material. Concrete data will be shown here. With the primary specification of the gears: outer diameter 80 $\phi$; pitch 15 deg.; and module 1.5, and the primary specification of the pickups of interval 0.8 mm, when open magnetic paths are provided, a sensor output sensitivity of 11 mVp/rpm is obtained as a result of an experiment. In this case, when the number of rotations of the output shaft which is calculated in terms of a speed (a minimum value) is 4 km/h, a sensor output is 385 mVp with the tire diameter of 1.9 m. When this level is subjected to signal processing of the zero-cross method, the phase difference can be read without EMI interferences. In the case where the output shaft is designed in such a manner that the torsion/torque sensitivity is 1 deg. at full torque 100 kg.m, the cycle of the pulse is 71 ms and the pulse phase difference of the gear pair (a maximum value) is 4.8 ms, when the number of rotations of the output shaft which is calculated in terms of a speed is 4 km/h.

Further according to the invention, the gear pair is collected in one location to enable teeth alignment at early stages. With this arrangement, zero-level adjustment of the torque signals can be performed so that fine adjustment of zero by electronic circuits will be unnecessary or facilitated. The invention can provide further effects, for example, the gear pair can be machined simultaneously or worked to have the same shape so that the detection accuracy of the phase difference can be improved, and also, the gear pair can be located where they can have large diameters.

As disclosed according to the invention, a pair of pickups are integrally connected. Consequently, the detection accuracy of the phase difference can be improved, and also, the invention takes effects such as improvement in installation space factors, and reduction of the number of housing members for the pickups and the number of operational steps.

What is claimed is:

1. In combination, a transmission which includes power transmission shafts rotatable for power transmission and power transmission gears fixedly mounted on said power transmission shafts for rotation therewith, and a phase difference type torque detection apparatus comprising:

a pair of phase detection gears fixedly mounted on at least one of the power transmission shafts so as to rotate therewith, said phase detection gears being apart from each other with a power transmission shaft portion left therebetween functioning as a torque bar between said gears thereby resulting in a difference between rotational phases of said phase detection gears upon rotation due to torsion of the power transmission shaft portion responsive to a torque thereon, at least one of said phase detection gears being one of said power transmission gears of said transmission;

two pickup means respectively opposite to said phase detection gears for detecting the rotation phases thereof and producing phase signals; and control means electrically connected to said pickup means for generating a phase difference signal based on the phase signals from said pickup means.

2. The combination according to claim 1, wherein said phase detection gears have different diameters and are formed with teeth on outer peripheries thereof, respectively, and the one of said phase detection gears larger in diameter than the other of said phase detection gears has a number of teeth which is an integer number multiple of the number of teeth of the other phase detection gear.

3. The combination according to claim 1, wherein said control means includes a digital signal processing device which is input with the phase signals from said pickup means and outputs one of a clock pulse signal representative of a difference between the phase signals and an analog signal produced through digital-analog conversion of the clock pulse signal.

4. The combination according to claim 1, wherein said transmission is a transmission for an automobile which has an engine mounted at a front portion of the automobile and driving rear wheels, said transmission includes an output shaft with a speed detection gear fixedly mounted thereon, and said one of the power transmission gears serving as the phase detection gear is said speed detection gear.

5. The combination according to claim 4, wherein one of said pickup means is opposite said speed detection gear and serves also for speed detection.

6. The combination according to claim 1, wherein said transmission is a transmission for an automobile which has an engine mounted at a front portion thereof and driving front wheels, said transmission includes a transfer shaft with idler and pinion reduction gears fixedly mounted thereon and an output shaft with a final gear fixedly mounted thereon, and said one of the power transmission gears serving as the phase detection gear is said idler gear.

7. The combination according to claim 6, wherein the other of said phase detection gears is one of said pinion reduction gear and said final gear.

8. The combination according to claim 1, wherein said transmission is a transmission for an automobile which has an engine mounted at a front portion thereof and driving front wheels, said transmission includes an input shaft with an output gear fixedly mounted thereon and an output shaft with a final gear fixedly mounted thereon, and said phase detection gears are said output gear and said final gear.

9. In combination, a transmission which includes shafts rotatable for power transmission and power transmission gears fixably mounted on said power transmission shafts for rotation therewith, and a phase difference type torque detection apparatus comprising:

first and second phase detection gears fixedly connected to one of said power transmission shafts for rotation therewith, said first phase detection gear being fixed to one of said power transmission gears on said one power transmission shaft;

a pipe fixedly connecting said second phase detection gear to said one power transmission shaft with a power transmission shaft portion, functioning as a torsion bar between said detection gears, left between positions where said first and second phase detection gears are respectively fixedly connected to said one power transmission shaft, said pipe transmitting to said second phase detection gear torsion of said power transmission shaft portion due to a torque acting thereon upon rotation thereby resulting in a difference between rotational phases of said first and second phase detection gears, said pipe having an end to which said second phase detection gear is fixed to be adjacent to and in parallel with said first phase detection gear;

two pickup means respectively opposite to said first and second phase detection gears for detecting the rotation phases thereof and producing phase signals; and control means electrically connected to said pickup means for generating a phase difference signal based on the phase signals from said pickup means.

10. The combination according to claim 9, wherein said first and second phase detection gears are in substantially the same shape and are formed with teeth on outer peripheries thereof, respectively, and said second phase detection gear is fixed to said pipe means with the teeth of said second phase detection gear axially aligned with the respective teeth of said first phase detection gear along an axis of rotation of said one power transmission shaft.

11. The combination according to claim 9, wherein said control means include a digital signal processing device which is input with the phase signals from said pickup means and outputs one of a clock pulse signal representative of a difference between the phase signals and an analog signal produced through digital-analog conversion of the clock pulse signal.

12. The combination according to claim 9, wherein said pickup means are integrally connected into a fixed positional relation to each other.

13. The combination according to claim 9, wherein said pipe is made of a non-magnetic material.

14. The combination according to claim 9, wherein said transmission is a transmission for an automobile which has an engine mounted at a front portion of the automobile and driving rear wheels, said transmission includes an output shaft with a speed detection gear fixedly mounted thereon, and said one of the power transmission gears, to which said first phase detection gear is fixed, is said speed detection gear.

15. The combination according to claim 9, wherein said transmission further includes a worm gear formed on an outer periphery of said output shaft, and said pipe is fitted on said worm gear to be slidable the therealong and rotatable with said output shaft.

16. The combination according to claim 9, wherein one of said pickup means opposite to said first phase detection gear serves also for speed detection.

* * * * *